(12) United States Patent
Lohokare

(10) Patent No.: US 7,380,982 B2
(45) Date of Patent: Jun. 3, 2008

(54) ACCURATE TEMPERATURE MEASUREMENT FOR SEMICONDUCTOR APPLICATIONS

(75) Inventor: Shrikant Lohokare, Fremont, CA (US)

(73) Assignee: Lam Research Corporation, Fremont, CA (US)

( * ) Notice: Subject to any disclaimer, the term of this patent is extended or adjusted under 35 U.S.C. 154(b) by 0 days.

(21) Appl. No.: 11/097,063

(22) Filed: Apr. 1, 2005

(65) Prior Publication Data
US 2008/0025370 A1    Jan. 31, 2008

(51) Int. Cl.
*G01K 1/00* (2006.01)
*G01K 3/06* (2006.01)
*G01K 3/14* (2006.01)
*G01K 11/20* (2006.01)
*G01K 11/06* (2006.01)
*G01J 5/28* (2006.01)

(52) U.S. Cl. .............. 374/137; 374/160; 374/120; 374/112; 250/337; 250/339.06

(58) Field of Classification Search .............. 374/160, 374/161, 162, 132, 1, 106; 116/216
See application file for complete search history.

(56) References Cited

U.S. PATENT DOCUMENTS

| | | | | |
|---|---|---|---|---|
| 2,261,473 A * | 11/1941 | Jennings | | 436/7 |
| 4,353,990 A * | 10/1982 | Manske et al. | | 435/287.4 |
| 4,996,104 A * | 2/1991 | Nicholas et al. | | 428/323 |
| 5,118,200 A * | 6/1992 | Kirillov et al. | | 374/120 |
| 5,158,364 A * | 10/1992 | Labes | | 374/106 |
| 5,159,564 A * | 10/1992 | Swartzel et al. | | 702/136 |
| 5,215,378 A * | 6/1993 | Manske | | 374/105 |
| 5,265,957 A * | 11/1993 | Moslehi et al. | | 374/1 |
| 5,313,044 A * | 5/1994 | Massoud et al. | | 219/121.85 |
| 5,377,126 A * | 12/1994 | Flik et al. | | 700/300 |
| 5,490,728 A * | 2/1996 | Schietinger et al. | | 374/7 |
| 6,090,690 A * | 7/2000 | Moslehi | | 438/513 |
| 6,479,801 B1 * | 11/2002 | Shigeoka et al. | | 219/502 |
| 6,572,265 B1 | 6/2003 | Gotthold et al. | | |
| 6,616,332 B1 * | 9/2003 | Renken et al. | | 374/162 |
| 6,769,803 B1 * | 8/2004 | Feichtinger et al. | | 374/1 |
| 6,786,637 B2 * | 9/2004 | Kuball et al. | | 374/161 |
| 7,080,940 B2 * | 7/2006 | Gotthold et al. | | 374/161 |

FOREIGN PATENT DOCUMENTS

JP    3407749 B2 *    5/2003

OTHER PUBLICATIONS

International Search Report dated Jan. 4, 2007.

* cited by examiner

*Primary Examiner*—Gail Verbitsky
(74) *Attorney, Agent, or Firm*—Martine, Penilla & Gencarella, LLP

(57) ABSTRACT

A temperature sensing component enables accurate in situ temperature measurement. The temperature sensing component is disposed within the process chamber. The temperature sensing component has a cavity, in which a transparent cover is disposed over an opening of the cavity. A material is disposed within the cavity of the temperature sensing component, and a sensor is configured to sense a phase change of the material through the transparent cover.

11 Claims, 10 Drawing Sheets

ACCURATE TEMPERATURE MEASUREMENT FOR SEMICONDUCTOR APPLICATIONS

BACKGROUND

In the fabrication of semiconductors there is a need to control the process parameters to ensure process consistency and repeatability. The need for process control is becoming more important as semiconductor devices are requiring sub-nanometer accuracy in dimension tolerance (e.g., CD, thickness, etch rate, uniformity, profile, etc.) as device nodes advance to smaller and smaller features (e.g., 90 nm and smaller). In the more advanced processes, feature size variations and dimensional tolerance in the fabricated device (within a wafer, wafer-to-wafer, lot-to-lot, die-to-die, chamber-to-chamber, etc.) resulting from all process variations are required to be smaller than 5 nm and within three-sigma of standard deviation. Soon, as wafer processing become even more advanced, the allowable feature size variations will be even smaller, e.g., smaller than 2 nm and within three-sigma of standard deviation.

One of the more difficult process parameters to control, maintain, and characterize is the process temperature. For example, the process temperature on chamber interior wall surfaces, the substrate support surface, and the substrate surface are difficult to control, maintain, and characterize. As discussed within the scope of the present invention, the reference to wafers and substrates is interchangeable since those of ordinary skill in semiconductor fabrication often interchangeably use both terms. Many process recipes are sensitive to process temperature variation. Temperature variation as small as 1 degree Celsius can have significant effect on the outcome of the process recipe. For example, in a semiconductor fabrication etch process, poly gate CD (critical dimension) can change by as much as 1 nm per 1 degree Celsius variation in the process temperature, e.g., the temperature on the surface of a substrate support, the surface of the substrate, etc. Some process recipes can be affected by even smaller variations, e.g., 0.5 degree Celsius, in the process temperature. Accordingly, accurate temperature control and measurement are becoming critical process control requirements as device nodes advance to smaller and smaller feature size. Therefore, accurate temperature measurement and characterization capable of measuring absolute temperature and sensing small temperature changes, e.g., changes as small as 0.5 degree Celsius or smaller, is desired.

Many of the currently available temperature measurement techniques have performance limitations and undesirable effects. For example, many of the currently available temperature measurement techniques are unable to measure the in situ process temperature accurately. The techniques that have the capability to measure the in situ process temperature of a wafer usually include placing a special wafer with temperature sensors embedded on the wafer. Placing a special wafer in the process chamber requires interrupting the normal flow of processing. Usually, placing a special wafer into the process chamber requires venting the process chamber to ambient pressure. Once the process chamber is vented, considerable amount of time is required to bring the chamber back to process operating conditions (e.g., pressure, temperature, etc.), which affects the throughput of lot processing. Also, in many cases, the embedded sensors could be a source of contamination that may cause device defects. In addition, these special wafers with embedded sensors are expensive and the sensors are typically not very robust. When the sensors are exposed to process operating conditions, they could fail or work improperly. Furthermore, the embedded sensors are not acceptable for delivering the desired measurement accuracy as most of these sensors have a temperature measurement uncertainty of 0.5 degree Celsius or more. Thus, an improved in situ temperature measurement method and apparatus are needed.

SUMMARY

Broadly speaking, the present invention provides the methods and structures that enable accurate in situ temperature measurement.

In one embodiment, a process chamber with a temperature sensing component enabling accurate in situ temperature measurement is provided. In this embodiment, the temperature sensing component is disposed within the process chamber. The temperature sensing component has a cavity, in which a transparent cover is disposed over an opening of the cavity. A material is disposed within the cavity of the temperature sensing component, and a sensor is configured to sense a phase change of the material through the transparent cover.

In another embodiment, another process chamber with a temperature sensing component enabling accurate in situ temperature measurement is provided. In this embodiment, the temperature sensing component is disposed on a surface within the process chamber (e.g., an interior surface of a process chamber, surface on a substrate support, etc). The temperature sensing component has a cavity. A material is disposed within the cavity of the temperature sensing component, wherein the material is in contact with the surface within the process chamber. A sensor is configured to sense a phase change of the material.

In yet another embodiment, a method for accurate in situ temperature measurement is provided. The method includes placing a temperature sensing component within a process chamber. The temperature sensing component having an embedded material. Then, a process operation is initiated within the process chamber. After a certain amount of time, the process operation will cause a phase change of the embedded material. The phase change of the embedded material is then detected. A temperature associated with the phase change is recorded.

Other aspects and advantages of the present invention will become apparent from the following description, taken in conjunction with the accompanying drawings, illustrating by way of examples the principles of the invention.

BRIEF DESCRIPTION OF THE DRAWINGS

The present invention will be readily understood by the following detailed description in conjunction with the accompanying drawings, and like reference numerals designating like structural elements.

DETAILED DESCRIPTION

The present invention, as illustrated by the following embodiments, provides the methods and structures that enable accurate in situ temperature measurement for processing substrates, and in particular, for fabricating semiconductors. The embodiments of the present invention can be easily integrated into process chambers for accurate in situ temperature measurement, thus improving overall process control, process monitoring, and process repeatability without affecting process throughput and yield. As should be appreciated, the present invention can be implemented in numerous ways, including a method or system. In some instances, well known process operations and components have not been described in detail in order to avoid obscuring the present invention.

Figure 1:
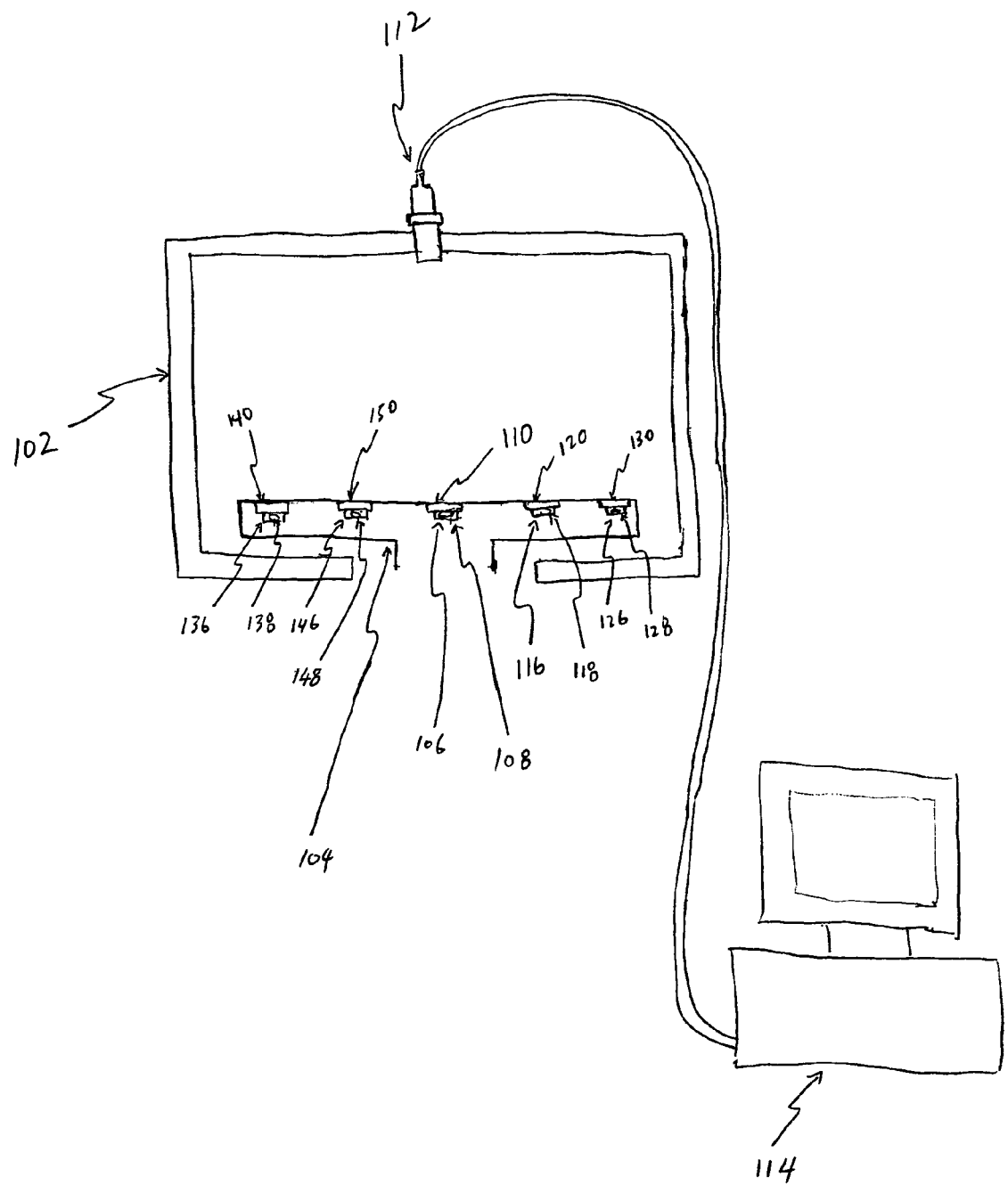
FIG. 1 is a cross-sectional diagram of a process chamber having temperature sensing components disposed therein, in accordance with one embodiment of the present invention.

FIG. 1 shows a substrate process chamber system 100 according to one embodiment of the present invention. Process chamber 102 includes a substrate support 104, wherein the substrate support 104 has a plurality of cavities 106, 116, 126, and 136. Each of the pluralities of cavities 106, 116, 126, and 136 is suitably configured to hold one of a plurality of materials 108, 118, 128, and 138 respectively therein. Each of a plurality of transparent covers 110, 120, 130, and 140 is suitably configured to respectively cover an opening of the plurality of cavities 106, 116, 126, and 136. Thus, each of the materials 108, 118, 128, and 138 is contained in a respective one of the plurality of cavities 106, 116, 126, and 136. Each of the materials 108, 118, 128, and 138 is substantially sealed and isolated from the interior environment of the process chamber. Since the materials 108, 118, 128, and 138 are isolated from the interior of the process chamber 102 they are also prevented from introducing any contaminants into the process chamber 102. In order to properly seal and isolate the materials 108, 118, 128, and 138, the transparent covers 110, 120, 130, and 140 are made from a suitably robust material to withstand the process conditions within the process chamber 102. One example of such a robust material is quartz.

Still referring to FIG. 1, one or more sensors 112 are configured in the process chamber 102 to monitor a phase change of each one of the materials 108, 118, 128, and 138. For ease of illustration, FIG. 1 shows one sensor 112 configured in the process chamber 102. However, one or more sensors 112 may be configured in the process chamber 102 to monitor each one of the materials 108, 118, 128, and 138 for the respective phase change of each of the materials. The phase change data gathered by one or more of the sensors 112 are transmitted to a monitor system 114. The monitor system 114 may include a system controller, which controls all the components of the process chamber system 100 including the process operation of the process chamber 102. For example, the system controller may control the operation of process chemicals into the process chamber 102, one or more heaters to heat the surfaces in the process chamber 102 to process a substrate, energy, e.g., RF, to energize the chemicals in the process chamber 102 to initiate process, etc. The monitor system 114 processes the data, e.g., using a data processing algorithm, and appropriately presents the analyzed data to a user by way of a user interface, e.g., a screen monitor.

As indicated, the one or more sensors 112 monitor the phase change of the materials 108, 118, 128, and 138 and record the phase change data as each phase change occurs for each of the materials. The temperature associated with a phase change of a material, e.g., changing from a solid phase to a liquid phase, is a constant for a specific composition of material at a given pressure. Thus, the phase change temperature for a known composition of material could be used as a reference to measure process temperature in the process chamber 102.

As shown in FIG. 1, the materials 108, 118, 128, and 138 are respectively contained in one of the plurality of cavities 106, 116, 126, and 136 that is incorporated in the substrate support 104. A phase change of each of the materials 108, 118, 128, and 138 can be used to monitor, measure, and characterize the process temperature of the substrate support 104. For example, as the process is initiated in the process chamber 102, the substrate support 104 is typically heated. As a sufficient amount of heat energy is transferred from a heater to the substrate support 104, the materials 108, 118, 128, and 138 in the respective cavities 106, 116, 126, and 136 will begin to undergo phase changes. The amount of heat energy that is transferred to the substrate support can be measured and quantified over time by a process chamber system controller. In the meantime, one or more sensors 112 are monitoring the materials 108, 118, 128, and 138 for phase changes. As a phase change occurs, the location, e.g., contact surface, where the material is located has reached the phase change temperature associated with that material.

Since heat distribution across a surface is rarely uniform, embodiments of the present invention are capable of determining the temperature distribution across a surface. For example, as illustrated in FIG. 1, materials 108, 118, 128, and 138 are disposed in the plurality of cavities 106, 116, 126, and 136 located at different areas across the surface of the substrate support 104. The temperature distribution across the surface of the substrate support 104 can be determined as each one of the materials 108, 118, 128, and 138 undergoes a phase change. Materials 108, 118, 128, and 138 can be comprised of the same composition or materials 108, 118, 128, and 138 can be comprised of different compositions. If each of the materials 108, 118, 128, and 138 is comprised of a known composition with a known phase change temperature, the temperature distribution across the surface of the substrate support 104 can be determined over time as heat energy is supplied to the substrate support 104 and each material, over time, undergoes a phase change.

Since each of the materials 108, 118, 128, and 138 is respectively sealed in each of the cavities 106, 116, 126, and 136 no significant loss of material would occur over time. Accordingly, the materials 108, 118, 128, and 138 can be reused for repeated process cycles in the process chamber 102.

It is well known in chemical and material science that organic and some inorganic compounds exhibit very precise melting points, e.g., within the range of 0.1 or 0.2 degree Celsius. Some of these organic and inorganic compounds include naphthalene, salicylic acid, benzophenone, Cobalt (II) Nitrate, Aluminum benzoate, Aluminum acetate, Antimony (III) bromide, and Antimony (III) chloride.

Still referring to FIG. 1, the one or more sensors 112 are configured to sense the phase change of the materials 108, 118, 128, and 138. The phase change of a material will cause a change in the refractive index of the material. For some materials, the phase change will also cause a change in color of the material. As shown in FIG. 1, one or more sensors 112 are configured to sense these or other changes that accompany a phase change of a material through the transparent covers 110, 120, 130, and 140. One example of a sensor 112 that is capable of sensing a phase change as described is a laser spectrometer. The sensor 112 is connected to communicate with the process chamber system controller. The sensor 112 monitors the materials 108, 118, 128, and 138 and collects data for sensing phase changes. The sensor 112 sends the collected data to the process chamber system controller for processing. The process chamber controller using a data processing algorithm processes the data and generates optical constant values that correspond to phase change temperatures associated with the materials 108, 118, 128, and 138 contained in the respective plurality of cavities 106, 116, 126, and 136. The process chamber controller may be a separate unit located remotely from the monitor device 114. Alternatively, the process chamber controller and the monitor device 114 may be integrated as one combined unit. Regardless of the actual configuration of the process chamber controller and the monitor device 114, the process chamber controller communicates with the monitor device 114 and monitor device 114 provides process temperature information to a user through a user interface, e.g., a screen monitor.

Figure 2:
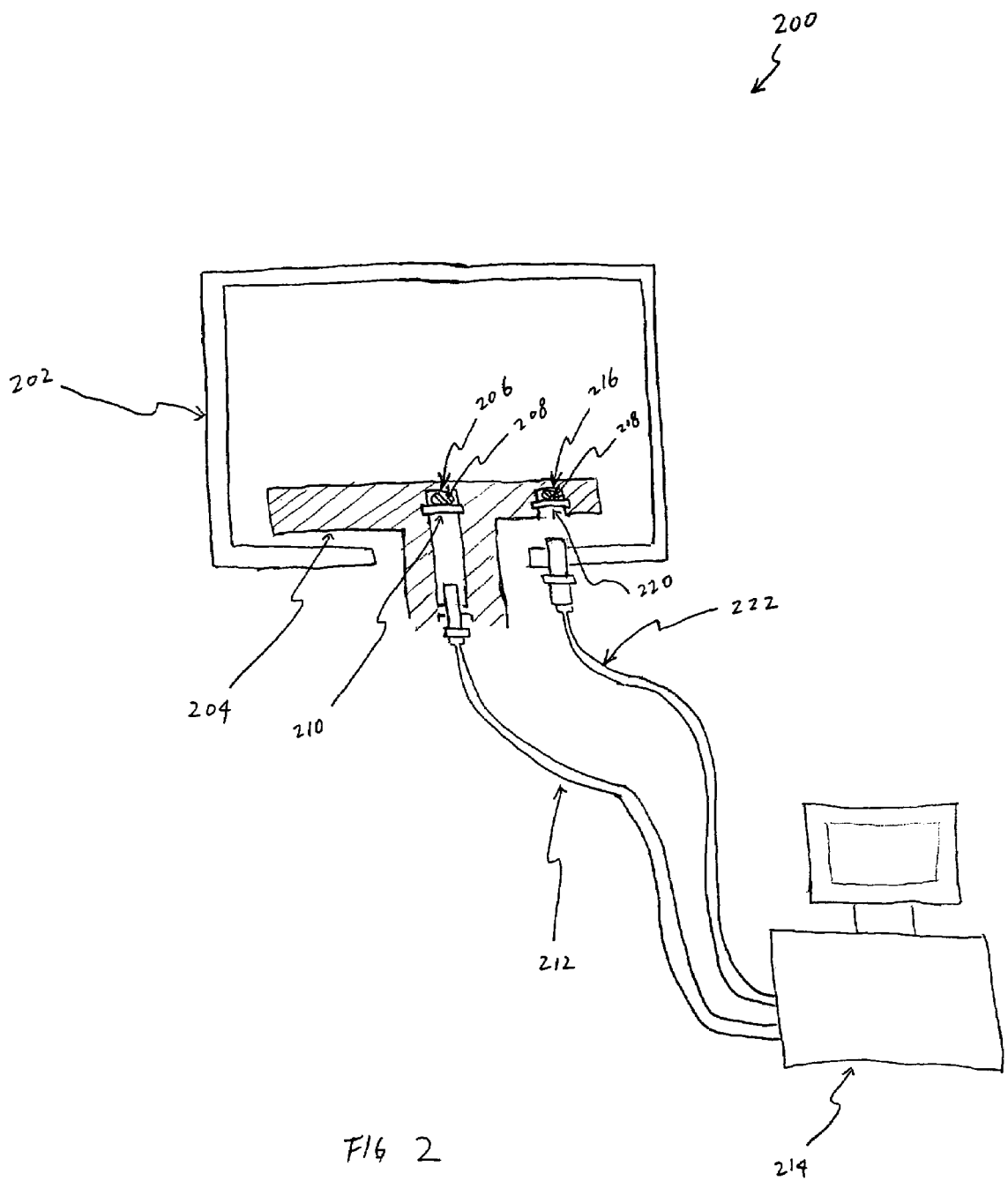
FIG. 2 is a close-up cross-sectional view of a portion of the temperature sensing component, in accordance with one embodiment of the present invention.

FIG. 2 shows a process chamber system 200 according to another embodiment of the present invention. Process chamber 202 includes a substrate support 204, wherein the substrate support 204 has a plurality of cavities 206 and 216. Each of the plurality of cavities 206 and 216 is suitably configured to hold one of a plurality of materials 208 and 218 respectively therein. Each of a plurality of transparent covers 210 and 220 is suitably configured to respectively cover an opening of the plurality of cavities 206 and 216. Thus, each of the materials 208 and 218 is contained in the respective one of plurality of cavities 208 and 218, and each one of the materials 208 and 218 is substantial sealed and isolated. The transparent covers 210 and 220 are made from a suitably robust material to withstand the process conditions in the process chamber system 200. One example of such a robust material is quartz.

As shown in FIG. 2, one or more sensors 212 and 222 are configured in the process chamber system 200 to monitor a phase change of each of the materials 208 and 218. The phase change data gathered by the one or more sensors 212 and 222 are transmitted a monitor system 214. The monitor system 214 may include a system controller, which controls all the components of the process chamber system 200 including the process operation of the process chamber 202. For example, the system controller may control the operation of process chemicals into the process chamber 202, one or more heaters to heat the surfaces in the process chamber 202 to process a substrate, energy, e.g., RF, microwave, etc., to energize the chemicals in the process chamber 202 to initiate process, etc. The monitor system 214 processes the data, e.g., using a data processing algorithm, and appropriately presents the analyzed data to a user by way of a user interface, e.g., a screen monitor.

Still referring to FIG. 2, the one or more sensors 212 and 222 monitor the phase change of the materials 208 and 218 and record the phase change data as each phase change occurs for each of the materials. The temperature associated with a phase change of a material, e.g., changing from a solid phase to a liquid phase, is a constant for a specific composition of material at a given pressure. Thus, the phase change temperature for a known composition of material could be used as a reference to measure process temperature in the process chamber 202, e.g., the surface temperature of the substrate support 204.

Figure 3:
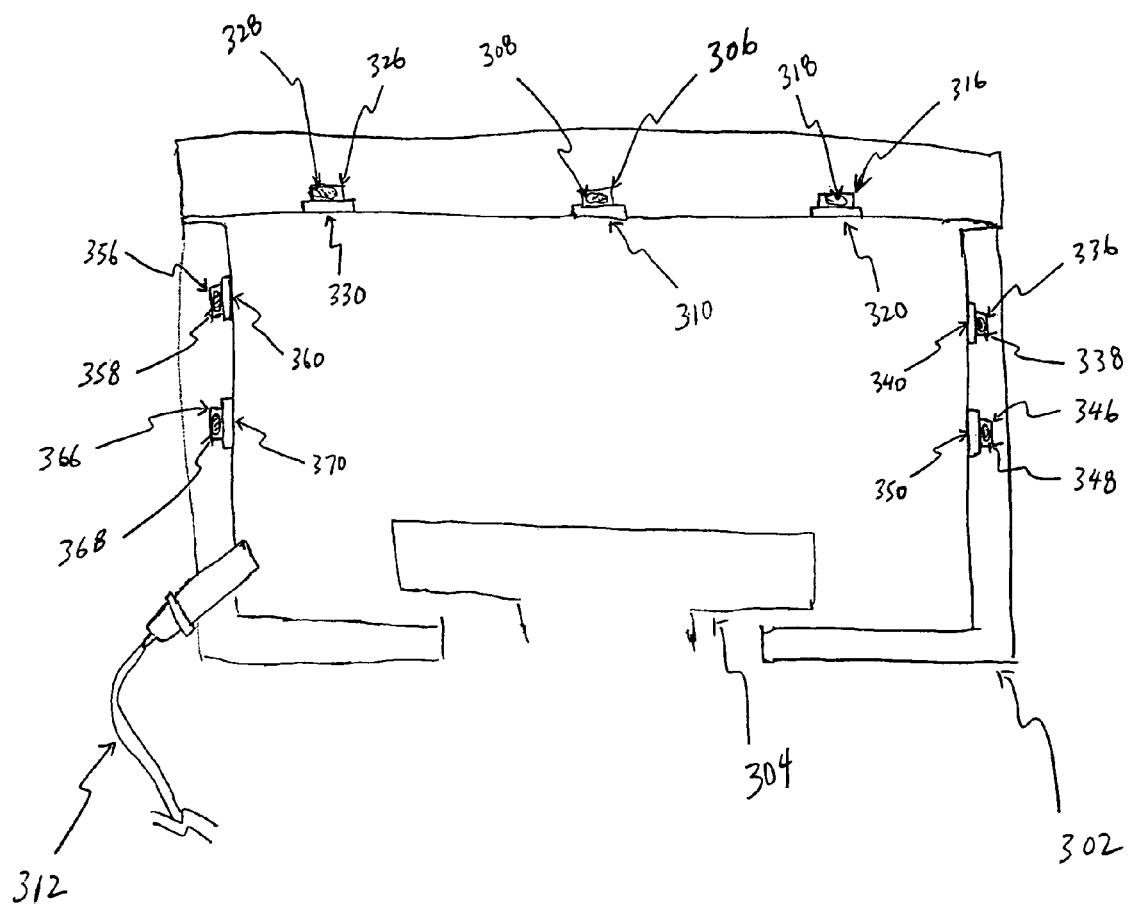
FIG. 3 is a cross-sectional diagram of a process chamber having temperature sensing components disposed therein, in accordance with one embodiment of the present invention.

FIG. 3 shows a process chamber system 300 in accordance with another embodiment of the present invention. Process chamber 302 includes a substrate support 304 and a plurality of cavities 336, 346, 356, and 366 incorporated into the walls of the chamber 302. Each of a plurality of materials 338, 348, 358, and 368 is respectively contained in one of the plurality of cavities 336, 346, 356, and 366 in the walls of the chamber, 302. Each of plurality of cavities 336, 346, 356, and 366 is respectively sealed by one of a plurality of transparent covers 340, 350, 360, and 370. One or more sensors 312 are configured to sense a phase change of each of the plurality of materials 338, 348, 358, and 368 through the respective one of plurality of transparent covers 340, 350, 360, and 370. Although one sensor 312 is shown in FIG. 3, one or more sensors 312 can be configured in process chamber 302 to sense the phase change of each of the materials 308, 318, 328, 338, 348, 358, and 368. In one implementation, the sensor 312 may be a laser spectrometer. The sensor 312 is connected to communicate with a process chamber system controller. The sensor 312 sends data collected from monitoring the materials 308, 318, 328, 338, 348, 358, and 368 to the process chamber system controller for processing the data. The process chamber controller using a data processing algorithm processes the data and generates optical constant values that correspond to phase change temperatures associated with materials 308, 318, 328, 338, 348, 358, and 368. The phase change temperature can be further processed and presented to a user by way of a user interface, e.g., a screen monitor. The information presented to a user could be in the form of temperature distribution plots, e.g., plots of temperature versus time distribution, temperature versus location distribution, etc.

Figure 4:
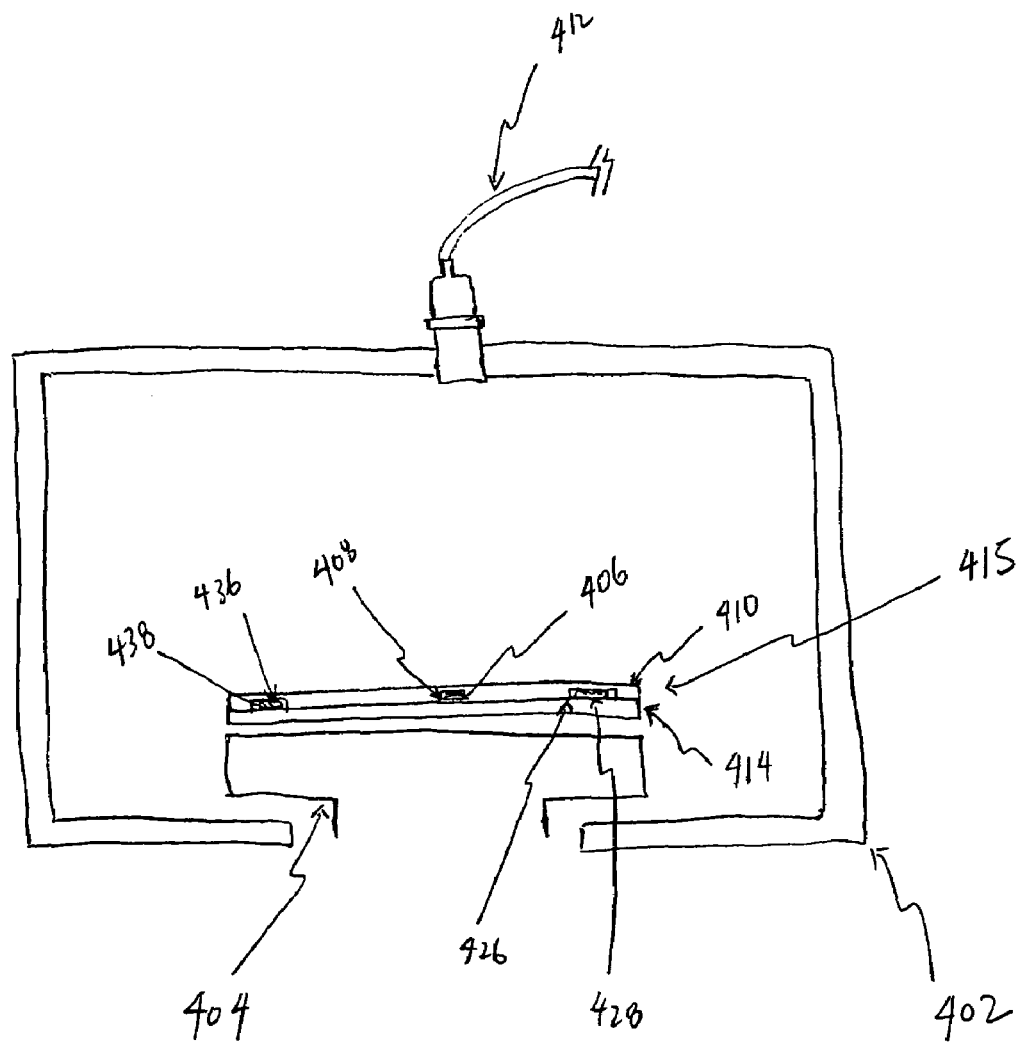
FIG. 4 is a cross-sectional diagram of a process chamber having a temperature sensing component disposed on the surface of a substrate support, in accordance with one embodiment of the present invention.

FIG. 4 shows a cross-sectional view of a process chamber system 400 in accordance with one embodiment of the present invention. In process chamber system 400, a substrate support 404 is disposed in process chamber 402. A temperature sensing test substrate 415 is disposed on substrate support 404. The temperature sensing test substrate 415 comprises of a substrate layer 414 and a transparent layer 410. A plurality of cavities 406, 426, and 436 are configured in the transparent layer 410, wherein one of plurality of materials 408, 428, and 438 is respectively disposed in one of the plurality of cavities 406, 426, and 436. The materials 408, 428, and 438 are in contact with the substrate layer 414. The transparent layer 410 seals the materials 408, 428, and 438 from the interior environment of the process chamber 402, such that materials 408, 428, and 438 cannot induce any contaminants into the interior environment of the process chamber 402. One or more sensors 412 are configured in process chamber 402 to sense phase changes of the materials 408, 428, and 438.

Figure 5:
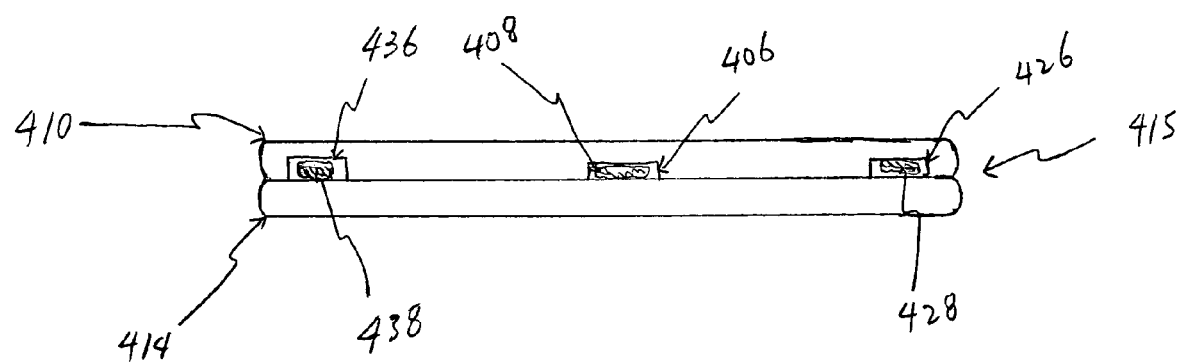
FIG. 5 is a close-up cross-sectional view of a temperature sensing component capable of sensing temperature on the surface of a substrate support, in accordance with one embodiment of the present invention.

FIG. 5 shows a close-up cross-sectional view of the temperature sensing test substrate 415 in accordance with an embodiment of the present invention. The temperature sensing test substrate 415 comprises of a substrate layer 414 and a transparent layer 410. The transparent layer 410 is configured with a plurality of cavities 406, 426, and 436. Each of the cavities 406, 426 and 436 contains one of plurality of materials 408, 428, and 438. The materials 408, 428, and 438 are in contact with the substrate layer 414, such that at thermo-equilibrium, the temperature of each of the materials 408, 428, and 438 is at the same temperature as the substrate layer 414 at each contact surface area.

Referring back to FIG. 4, as the process is initiated in the process chamber 402, and the substrate support 404 is typically heated. The temperature sensing test substrate 415 may be used to determine the temperature or heat distribution of a substrate that is being processed in process chamber 402.

As a sufficient amount of heat energy is transferred from a heater to the substrate support 404, the substrate layer 414 of the temperature sensing test substrate 415 is also heated by conduction and convection. The substrate layer 414 would simulate an actual substrate that is being processed in the process chamber 402. Thus, the temperature of the substrate layer 414 would be similar to that of a substrate that is being processed in the process chamber 402. The materials 408, 428, and 438 being in contact with the substrate layer 414 would be at the same temperature as the substrate layer 414. As sufficient heat energy is transferred to materials 408, 428, and 438, phase change of the materials would be initiated. One or more sensors 412 sense the phase change of the materials 408, 428, and 438. The one or more sensors 412 transmit the sensed data to a process chamber system controller to process the data and present the processed data to a user by way of a user interface, e.g., a screen monitor. The processed data presented to a user could be in the form of a temperature distribution plot of the substrate layer 414, which would be representative of a temperature distribution plot of a processed substrate.

Figure 6:
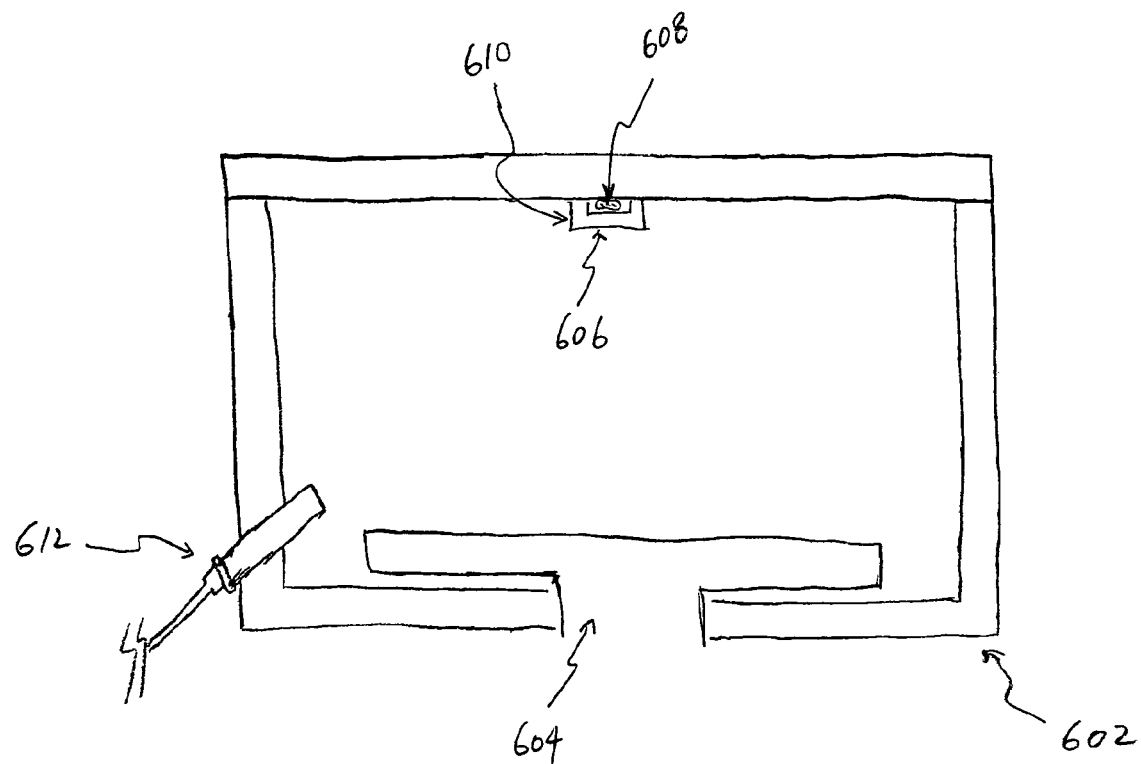
FIG. 6 is cross-sectional diagram of a process chamber having a temperature sensing component disposed therein, in accordance with one embodiment of the present invention.

FIG. 6 shows a temperature sensing component in accordance with one embodiment of the present invention. Temperature sensing component 610 is disposed in process chamber 602. The temperature sensing component includes a transparent shell 606 configured to contain a material 608. The transparent shell 606 is made of a robust material capable of withstanding the conditions (e.g., heat, pressure, RF energy, microwave, reactive plasma, etc.) within the process chamber 602 without any degradation in its material properties. One example of such a robust material is quartz. Material 608 is configured to be in contact with any surface within the process chamber 602, while being sealed between the contact surface within the process chamber 602 and the transparent shell 606. A sensor 612 is located in the process chamber 602 to sense a phase change of material 608 through the transparent shell 606. For example, sensor 612 may be a laser spectrometer. Material 608 may be an organic or an inorganic compound having a very precise melting point, e.g., melting point within the range of 0.1 or 0.2 degree Celsius. Some of these organic and inorganic compounds include naphthalene, salicylic acid, benzophenone, Cobalt (II) Nitrate, Aluminum benzoate, Aluminum acetate, Antimony (III) bromide, and Antimony (III) chloride. For ease of illustration and discussion only one temperature sensing component 610 and sensor 612 are shown disposed in process chamber 602 in FIG. 6, however, within the scope of the present invention, any number of temperature sensing components and sensors may be implemented in process chamber 602.

As process is initiated in the process chamber 602, the chamber surfaces are also heated. The chamber surfaces could be heated in many different ways. The chamber surfaces could be heated by a circulating fluid, a heater, or any other appropriate means. The embodiments of the present invention provide the method and apparatus for accurately measuring the in situ process temperature.

The material 608 being in contact with a surface within the process chamber 602 would be at the same temperature as the contact surface. As a sufficient amount of heat energy is transferred from the contact surface to material 608, material 608 will undergo a phase change. Sensor 612 senses the phase change and transmits the phase change data to a process chamber system controller. The process chamber system controller processes the phase change data and provides the processed phase change data to a user by way of a user interface, e.g., a screen monitor. The processed phase change data could be in the form of temperature distribution plots.

Figure 7A:
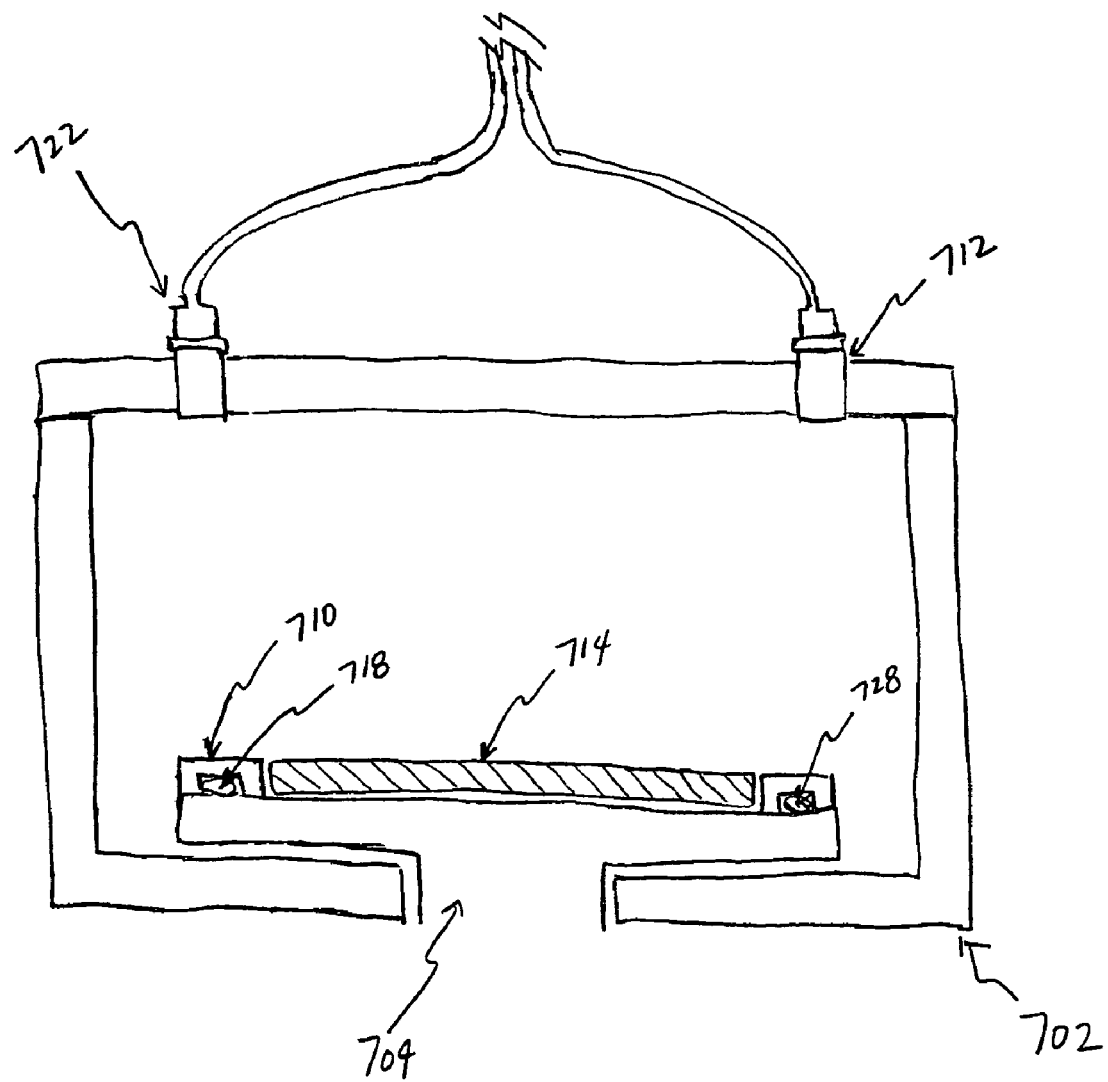
FIG. 7A is a cross-sectional view of a process chamber having a temperature sensing component disposed on the surface of a substrate support, the substrate support also having a substrate disposed thereon, in accordance with one embodiment of the present invention.

FIG. 7A shows another temperature sensing component in accordance with one embodiment of the present invention. A temperature sensing component 710 is disposed on a substrate support 704 in process chamber 702. Substrate 714 is also disposed on substrate support 704. Temperature sensing component 710 may have a plurality of cavities. As shown in FIG. 7A, materials 718 and 728 are respectively contained in two of the cavities in temperature sensing component 710. Materials 718 and 728 are in contact with substrate support 704. Sensors 712 and 722 are configured to sense phase change of materials 718 and 728. Although FIG. 7A shows sensors 712 and 722 configured to sense phase change of materials 718 and 728, any number of sensors can be used to sense the phase change of materials 718 and 728. For example, one sensor may be configured to sense phase change for any number of materials contained in the temperature sensing component 710.

Figure 7B:
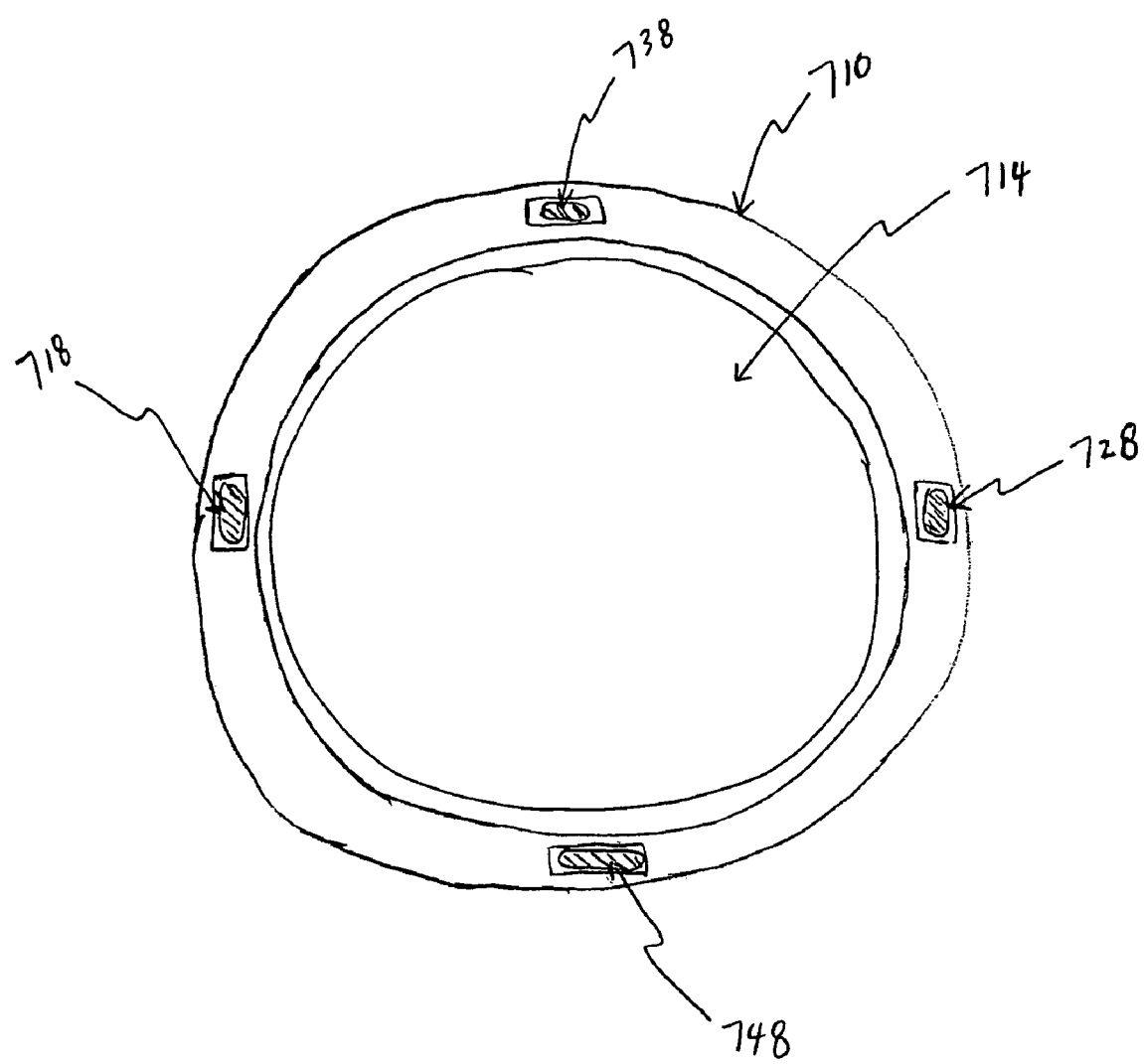
FIG. 7B is a top view of a temperature sensing component capable of sensing the temperature on the surface of a substrate support, in accordance with one embodiment of the present invention.

FIG. 7B show a top view of temperature sensing component 710 and substrate 714. The temperature sensing component 710, in accordance with one embodiment of the present invention, enables simultaneous temperature sensing and substrates processing at the same time. As a process is initiated in process chamber 702, the substrate support 704 is typically heated to facilitate processing of substrate 714. As a sufficient amount of heat energy is transferred from a heater to the substrate support 704 to heat the substrate 714 for processing, the materials 718, 728, 738, and 748 are also heated. The materials 718, 728, 738, and 748 are selected for having very precise melting points, e.g., within the range of 0.1 or 0.2 degree Celsius. As is well known, the temperature associated with a phase change of a material is a constant for a specific composition of material, therefore, the phase change temperature for materials 718, 728, 738, and 748 may be used as a reference temperature to control and monitor the process temperature for substrate 714.

Sensors 712 and 722 configured to sense phase change of materials 718, 728, 738, and 748 transmit phase change data to a process chamber system controller to control the process temperature, e.g., the surface temperature of the substrate, to prevent temperature variations that would affect process outcomes, e.g., critical dimensions of device features in semiconductors. In addition, the process chamber system controller could provide real-time processed phase change data to a user by way of a user interface, e.g., screen monitor. The processed phase change data could be temperature distribution plots.

Figure 8:
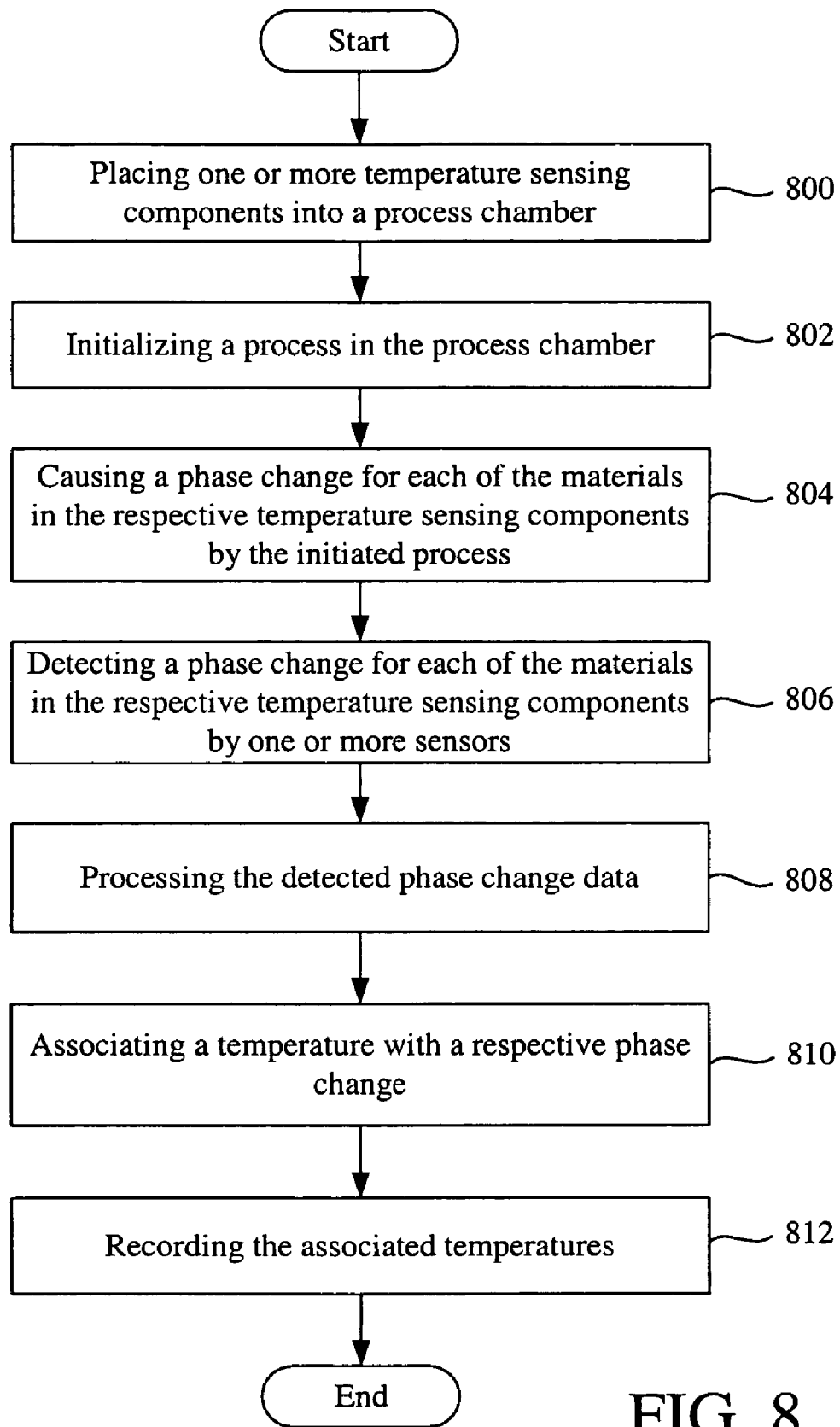
FIG. 8 is a flow chart detailing a process to accurately measure the in situ process temperature, in accordance with one embodiment of the present invention.

FIG. 8 shows a flowchart detailing a method of accurately measuring in situ process temperature in accordance with one embodiment of the present invention. The method begins with operation 800 by placing one or more temperature sensing components into a process chamber. The temperature sensing components may be any of the temperature sensing components discussed according to the various embodiments of the present invention. Then, a process is initiated in the process chamber in operation 802. The initiated process eventually causes a phase change to each of the materials in the respective temperature sensing components in operation 804. One or more sensors in the process chamber detect the phase changes of the materials in the respective temperature sensing components in operation 806. The process chamber system controller processes the phase change data for each of the materials in operation 808. A temperature associated with a respective phase change of each material is determined in operation 810, and in operation 812, the associated temperatures are recorded. It should be appreciated that the temperatures associated with the phase change for any of the materials listed herein are well documented. For example, naphthalene has a melting temperature of 80.5 degree Celsius, salicylic acid has a melting temperature of 135 degree Celsius, benzophenone has a melting temperature of 48.1 degree Celsius, Cobalt (II) Nitrate has a melting temperature of 55 degree Celsius, Aluminum benzoate has a melting temperature of 198 degree Celsius, Aluminum acetate has a melting temperature of 114 degree Celsius, Antimony (III) bromide has a melting temperature of 96.6 degree Celsius, and Antimony (III) chloride has a melting temperature of 73.4 degree Celsius.

Figure 9A:
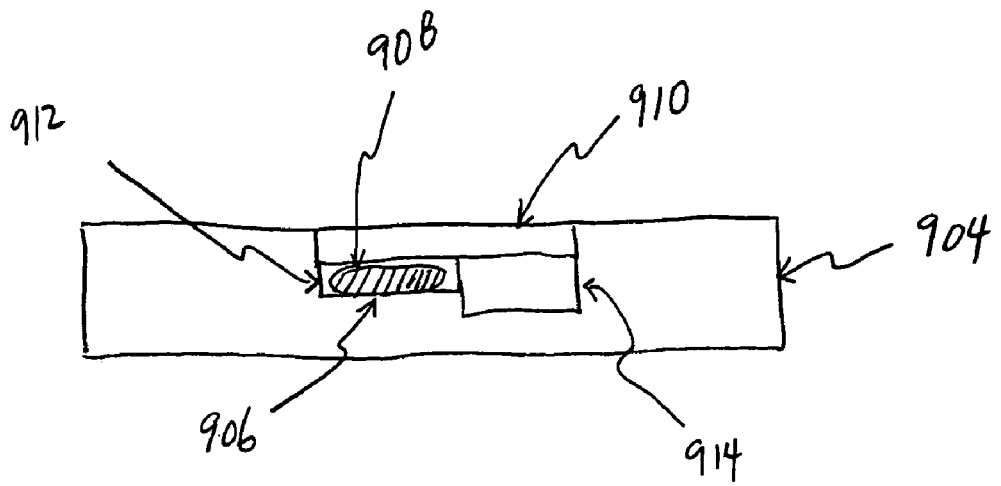
FIG. 9A is a cross-sectional view of a temperature indication apparatus, in accordance with one embodiment of the present invention.

FIG. 9A shows a temperature indicating apparatus in accordance with another embodiment of the present invention. FIG. 9A shows the temperature indicating apparatus 904 having a cavity 906. Cavity 906 has at least two chambers, for example, a first chamber 912 and a second chamber 914. In this embodiment, a material 908 is disposed in the first chamber 912. A cover 910 seals the cavity 906. The cover 910 may be a transparent cover, so that the temperature indicating apparatus 904 may be used to indicate in situ process temperature as discussed above. Similar to the temperature sensing components as previously discussed for other embodiments of the present invention, the temperature indicating apparatus 904 may be disposed in a processor chamber and the phase change of the material 908 may be sensed by a sensor configured to sense a phase change of the material 908 through the cover 910.

Figure 9B:
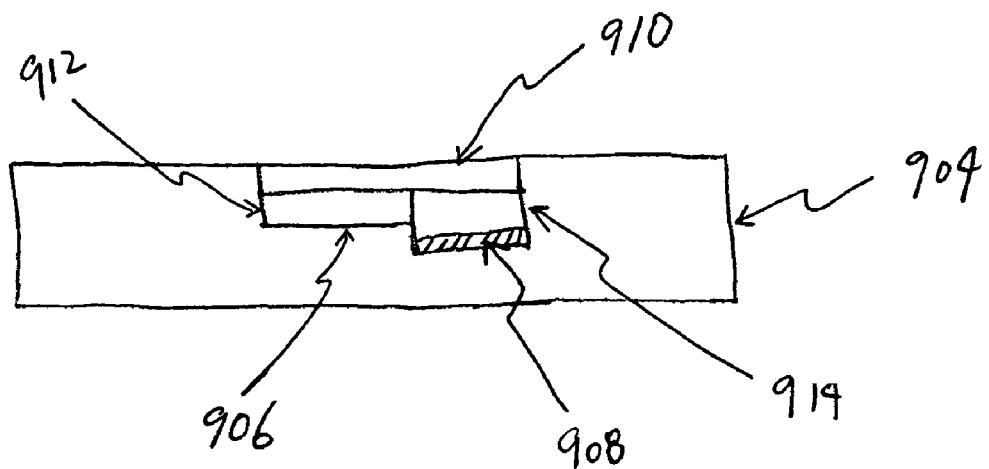
FIG. 9B is a cross-sectional view of a temperature indication apparatus indicating a phase change has occurred, in accordance with one embodiment of the present invention.

FIG. 9B shows a temperature indicating apparatus in accordance with one embodiment of the present invention in which material 908 has undergone a phase change. As shown in FIG. 9B, the material 908 is transferred from the first chamber 912 to the second chamber 914 as the material 908 changed from one phase to another phase, e.g., solid phase to liquid phase or vice versa. The temperature indicating apparatus 904 is capable of indicating whether a phase change temperature associated with the material 908 was reach by observing the spatial location of the material 908 in the cavity 906, i.e., whether the material is contained in the first chamber 912 or the second chamber 914. Accordingly, the temperature indicating apparatus 904 may be observed after a process cycle is completed to verify that a process temperature has reached a temperature associated with the phase change of material 908 at some point in the process as the process recipe was executed. In one embodiment of the present invention, cover 910 may not be a transparent cover. For example, where the temperature indication apparatus is used as a spatial indicator, it is not necessary to have a transparent cover.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A semiconductor process chamber, comprising:
  a temperature sensing component disposed within a wall defining the semiconductor process chamber, wherein the temperature sensing component has a cavity;
  a transparent cover disposed over an opening of the cavity;
  a material disposed within the cavity of the temperature sensing component; and
  a sensor disposed within the semiconductor process chamber and having a line of sight to the material, the sensor configured to sense a phase change of the material through the transparent cover.

2. The process chamber of claim 1, wherein the phase change includes one of changing from a solid phase to a liquid phase or changing from a liquid phase to a solid phase.

3. The process chamber of claim 1, wherein the material is one of an organic or an inorganic compound.

4. The process chamber of claim 3, wherein the organic compound is selected from the group consisting of naphthalene, salicylic acid, and benzophenone, and the inorganic compound is selected from the group consisting of Cobalt (II) Nitrate, Aluminum benzoate, Aluminum acetate, Antimony (III) bromide, and Antimony (III) chloride.

5. The process chamber of claim 1, wherein the cavity has at least two chambers and the material within the cavity is transferred from a first chamber to a second empty chamber as the material undergoes the phase change.

6. The process chamber of claim 1, wherein the sensor is a laser spectrometer, and the transparent cover is composed of quartz.

7. A method of characterizing temperature distribution in a process chamber, the method comprising:
  locating a temperature sensing component having an embedded material within a wall of the semiconductor process chamber;
  initiating a process operation within the semiconductor process chamber;
  detecting a phase change of the embedded material within the wall of the process chamber through a sensor disposed within the semiconductor process chamber; and
  recording a temperature associated with the phase change.

8. The method of claim 7, further comprising:
  placing another temperature sensing component into a substrate support of the process semiconductor chamber.

9. The method of claim 7, wherein the wall is a sidewall of the semiconductor process chamber.

10. The method of claim 7, wherein the phase change includes one of changing from a solid phase to a liquid phase or changing from a liquid phase to a solid phase and wherein the phase change causes movement from a first chamber to a second empty chamber within the temperature sensing component.

11. The method of claim 7, further comprising:
  covering the embedded material with a transparent cover.

* * * * *